US009615295B2

(12) United States Patent
Kim et al.

(10) Patent No.: US 9,615,295 B2
(45) Date of Patent: Apr. 4, 2017

(54) CELL MEASUREMENT AND SPECIAL FUNCTION SMALL CELL SELECTION METHOD AND APPARATUS FOR USE IN A MOBILE COMMUNICATION SYSTEM

(71) Applicant: Samsung Electronics Co., Ltd., Gyeonggi-do (KR)

(72) Inventors: Sangbum Kim, Gyeonggi-do (KR); Soenghun Kim, Gyeonggi-do (KR); Himke Van Der Velde, Zwolle (NL); Gert-Jan Van Lieshout, Apeldoorn (NL)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/663,673

(22) Filed: Mar. 20, 2015

(65) Prior Publication Data

US 2015/0271713 A1   Sep. 24, 2015

(30) Foreign Application Priority Data

Mar. 21, 2014   (KR) .................. 10-2014-0033233

(51) Int. Cl.
*H04W 36/00* (2009.01)
*H04W 36/30* (2009.01)
*H04W 84/04* (2009.01)
*H04W 76/02* (2009.01)

(52) U.S. Cl.
CPC ...... *H04W 36/0055* (2013.01); *H04W 76/025* (2013.01); *H04W 84/045* (2013.01)

(58) Field of Classification Search
CPC ......... H04W 4/14; H04W 4/16; H04W 28/08; H04M 3/42
USPC ........ 455/437, 438, 450, 453; 370/235, 236, 370/252, 329
See application file for complete search history.

(56) References Cited

U.S. PATENT DOCUMENTS

| 9,113,450 | B2 | 8/2015 | Pelletier et al. |
| 2012/0244905 | A1 | 9/2012 | Zhao et al. |
| 2013/0016696 | A1 | 1/2013 | Adjakple et al. |
| 2014/0056243 | A1 | 2/2014 | Pelletier et al. |

FOREIGN PATENT DOCUMENTS

| JP | 2012-049924 A | 3/2012 |
| WO | WO 2014/021763 A2 | 2/2014 |

OTHER PUBLICATIONS

International Search Report dated Jun. 30, 2015 in connection with International Application No. PCT/KR2015/002731; 3 pages.
Interdigital Communications; "Special Cell for SeNB with Dual Connectivity"; 3GPP TSG-RAN WG2 #84; Tdoc R2-134398; San Francisco, CA; Nov. 11-15, 2013; 3 pages.

*Primary Examiner* — Sam Bhattacharya

(57) ABSTRACT

Disclosed is a method by a base station in a wireless communication system. The method includes receiving cell measurement information related to the serving and neighboring cells from at least one terminal served by the base station, receiving status information including load information on serving cells of the small cell base station from the small cell base station, determining a secondary cell group (SCG) of the serving cells of the small cell base station that are capable of serving the terminal based on the cell measurement information and the status information and transmitting information on the SCG to the small cell base station.

18 Claims, 18 Drawing Sheets

FIG. 3

| | Report triggering | Action upon entering condition | Action upon leaving condition |
|---|---|---|---|
| Event A1 | Serving becomes better than threshold | Report is triggering | No report is triggering |
| Event A2 | Serving becomes worse than threshold | Report is triggering | No report is triggering |
| Event A3 | Neighbour becomes offset better than PCell | Report is triggering | Report is triggering |
| Event A4 | Neighbour becomes better than threshold | Report is triggering | No report is triggering |
| Event A5 | PCell becomes worse than threshold1 and neighbour becomes better than threshold2 | Report is triggering | No report is triggering |
| Event A6 | Neighbour becomes offset better than SCell | Report is triggering | Report is triggering |

CELL MEASUREMENT AND SPECIAL FUNCTION SMALL CELL SELECTION METHOD AND APPARATUS FOR USE IN A MOBILE COMMUNICATION SYSTEM

CROSS-REFERENCE TO RELATED APPLICATION AND CLAIM OF PRIORITY

The present application is related to and claims the benefit under 35 U.S.C. §119(a) to Korean Patent Application No. 10-2014-0033233, filed on Mar. 21, 2014, the entire disclosure of which is hereby incorporated herein by reference.

TECHNICAL FIELD

The present disclosure relates to a cell measurement and special function cell selection method and apparatus for use in a mobile communication system. In particular, the present disclosure relates to a method and apparatus for selecting pSCell among the small cells of the mobile communication system.

BACKGROUND

Mobile communication systems were developed to provide mobile users with communication services. With the rapid advance of technologies, the mobile communication systems have evolved to the level capable of providing high speed data communication services beyond the early voice-oriented services. Recent studies are focused on the LTE-Advanced (LTE-A) for improving data rates with the adoption of various new techniques to the legacy LTE system. The LTE-A standardization is almost completed to the extent of commercialization around late 2010, the recent studies are focused on the improvement of data rates with the adoption of various technologies.

One of the representative technologies for increasing the data rate is Dual Connectivity. The Dual Connectivity is a technology for a terminal to transmit/receive data to and from a plurality of base stations in parallel. In order to accomplish this, it is necessary for the terminal to monitor the cells continuously to check the signals rich enough for connection through efficient operations without increasing the complexities of the terminal and network.

To meet the demand for wireless data traffic that has increased since deployment of 4G communication systems, efforts have been made to develop an improved 5G or pre-5G communication system. Therefore, the 5G or pre-5G communication system is also called a 'Beyond 4G Network' or a 'Post LTE System.' The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, analog beam forming, and large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

To address the above-discussed deficiencies, it is a primary object of this disclosure to provide a cell measurement and special function cell selection method and apparatus for use in a mobile communication system. The present disclosure provides a cell measurement and special function cell selection method and apparatus that is capable of managing serving cells efficiently in the mobile communication system supporting dual connectivity.

In accordance with the present disclosure, a method implemented by a base station in a wireless communication system is provided. The method comprises receiving cell measurement information related to the serving and neighboring cells from at least one terminal served by the base station, receiving status information including load information on serving cells of the small cell base station from the small cell base station, determining a secondary cell group (SCG) of the serving cells of the small cell base station that are capable of serving the terminal based on the cell measurement information and the status information and transmitting information on the SCG to the small cell base station.

In accordance with the present disclosure, a base station in a wireless communication system is provided. The base station comprises a transceiver configured to transmit and receive a signal and a controller configured to receive cell measurement information related to the serving and neighboring cells from at least one terminal served by the base station, to receive status information including load information on serving cells of the small cell base station from the small cell base station, to determine a secondary cell group (SCG) of the serving cells of the small cell base station that are capable of serving the terminal based on the cell measurement information and the status information, and to transmit information on the SCG to the small cell base station.

In accordance with the present disclosure, a small cell base station in a wireless communication system is provided. The small cell base station comprises a transceiver configured to transmit and receive a signal and a controller configured to receive information on a secondary cell group (SCG) of the small cell base station that are capable of serving the terminal from a base station, and select a specific cell for a physical uplink control channel (PUCCH) of the terminal based on the information on the SCG.

In accordance with the present disclosure, a method implemented by a small cell base station in a wireless communication system is provided. The method comprises receiving information on a secondary cell group (SCG) of the small cell base station that are capable of serving the terminal from a base station, and selecting a specific cell for a physical uplink control channel (PUCCH) of the terminal based on the information on the SCG.

In accordance with the present disclosure, a terminal in a wireless communication system is provided. The terminal comprises a transceiver configured to transmit and receive a signal; and a controller configured to receive small cell base station configuration information including an indicator indicating the specific cell from a base station, and transmit a physical uplink control channel (PUCCH) to a small cell base station via the specific cell indicated by the indicator. The specific cell is determined based on a secondary cell group (SCG) of serving cells of the small cell base station that are capable of serving the terminal, and the SCG is determined based on cell measurement information measured by the terminal and the status information of the small cell base station.

In accordance with the present disclosure, a method implemented by a terminal in a wireless communication system is provided. The method comprises receiving small cell base station configuration information including an indicator indicating the specific cell from a base station and transmitting a physical uplink control channel (PUCCH) to a small cell base station via the specific cell indicated by the indicator. The specific cell is determined based on a secondary cell group (SCG) of serving cells of the small cell base station that are capable of serving the terminal, and the SCG is determined based on cell measurement information measured by the terminal and the status information of the small cell base station.

The cell measurement and special function cell selection method and apparatus of the present disclosure is advantageous in terms of managing a plurality of small cells efficiently in a mobile communication system.

Also, the cell measurement and special function cell selection method and apparatus is advantageous in that a SeNB selects a special cell efficiently in the mobile communication system supporting the dual connectivity.

Also, the cell measurement and special function cell selection method and apparatus is advantageous in that the MeNB selects a special cell efficiently in the mobile communication system supporting the dual connectivity.

Furthermore, the cell measurement and special function cell selection method and apparatus is advantageous in terms of reducing power consumption of the terminal in the mobile communication system supporting the dual connectivity and carrier aggregation.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a table listing the events triggering cell measurement reports to the eNB according to embodiments of the present disclosure;

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present disclosure are described with reference to the accompanying drawings in detail. The same reference numbers are used throughout the drawings to refer to the same or like parts. Detailed description of well-known functions and structures incorporated herein may be omitted to avoid obscuring the subject matter of the present disclosure. This aims to omit unnecessary description so as to make the subject matter of the present disclosure clear.

The present disclosure provides an efficient cell measurement and special function cell selection method and apparatus that is capable of managing serving cells efficiently in a mobile communication system supporting parallel connections to multiple base stations (e.g. dual connectivity system).

If the terminal is capable of communicating with multiple base stations simultaneously, it is possible to increase the data rate per terminal. In the LTE standard, this topic is discussed under the title of 'dual connectivity.' The present disclosure proposes a cell measurement and serving cell management method inevitable for implementation of dual connectivity.

A brief description is made of the concept of the dual connectivity under discussion in the LTE standardization process before beginning the explanation of the present disclosure.

Figure 1:
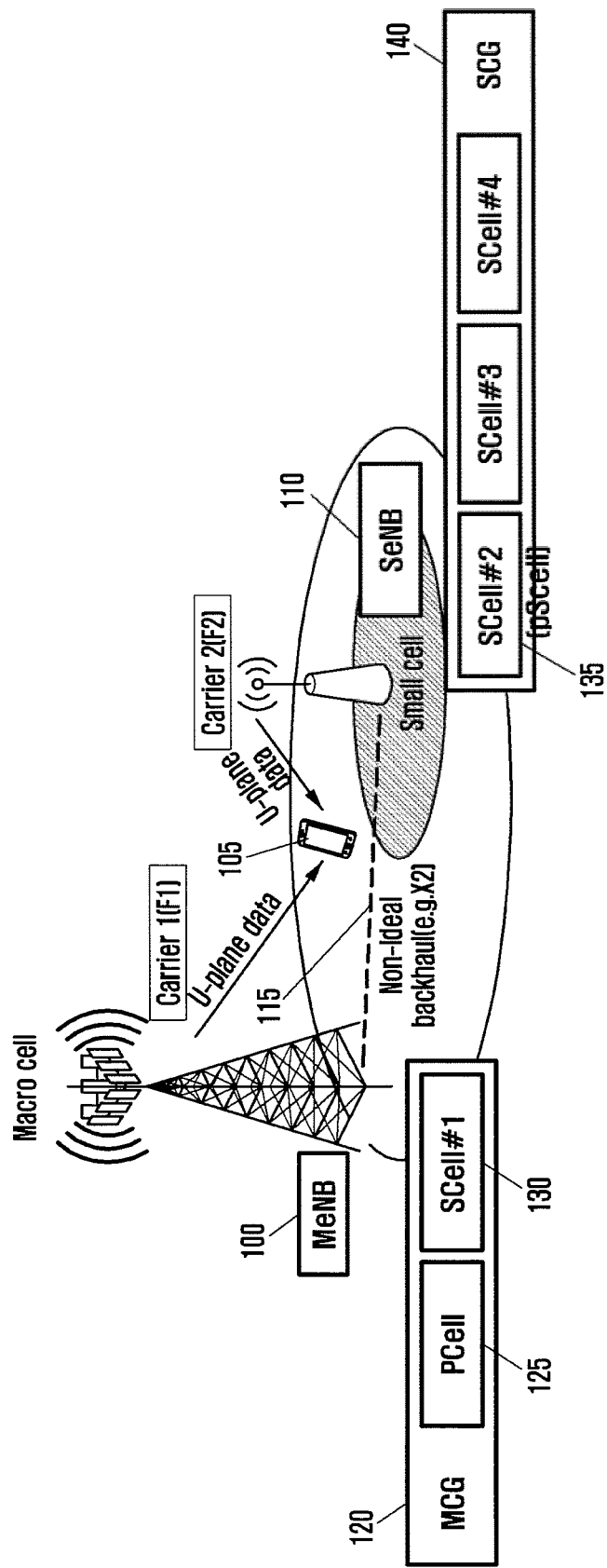
FIG. 1 illustrates a Dual Connectivity of LTE according to this disclosure.

FIG. 1 illustrates Dual Connectivity of LTE according to this disclosure. Referring to FIG. 1, a User Equipment (UE) 105 maintains connectivity to a macro evolved Node B (eNB) 100 and a small cell eNB 110 simultaneously for data transmission/reception. The macro eNB 100 is referred to as Master eNB (MeNB), and the small cell eNB 110 as Secondary eNB (SeNB). A plurality of small cells are located within the service area of the MeNB 100 which is connected to the SeNBs through wired backhaul networks.

It is assumed that the UE 105 uses total 5 serving cells belonging to the MeNB 100 and the SeNB 110. The set of serving cells of the MeNB 100 is referred to as Master Cell group (MCG) 120, and the MCG has one Primary Cell (PCell) 125 controls the functions of a legacy normal cell, such as connection establishment, connection re-establishment, and handover. The PCell 125 has a Physical Uplink Control Channel (PUCCH). The other serving cell(s), with the exception of the PCell 125, is referred to as Secondary Cell (SCell) 130.

FIG. 1 is directed to a scenario in which the MeNB 100 has one SCell 130 and the SeNB 110 has three SCells. The set of serving cells of the SeNB 110 is referred to as Secondary Cell Group (SCG) 140. In the course of transmitting/receiving data to/from the two eNBs, the MeNB 100 may generate a command to the SeNB 110 for adding, modifying, or releasing a serving cell. For this purpose, the MeNB 100 may send serving cell and neighbor cell measurement configuration information to the UE 105. The UE 105 performs measurement and report the measurement result to the MeNB 100 according to the configuration information.

In order for the SeNB 110 to transmit/receive data to/from the UE 105, a serving cell acts in a similar role as the PCell 125 of the MCG 120. In the present disclosure, such a cell is referred to as primary SCell (pSCell). The pSCell is one of the serving cells of the SCG 140 and has a PUCCH. The PUCCH carries Hybrid Automatic Repeat Request Acknowledgement/Negative-Acknowledgement (HARQ ACK/NACK), Channel Status Information (CSI), and Scheduling Request (SR).

The present disclosure proposes a cell measurement method that is capable of allowing the MeNB 100 to configure the SCG 140 efficiently. Also, the present disclosure provides a method of selecting the pSCell. Also, the present disclosure provides a method of conserving power consumption of the UE in the dual connectivity mode.

Embodiment 1

This embodiment provides an efficient cell measurement method and a pSCell selection method in the dual connectivity mode. The pSCell selection method can be summarized as follows.

Option 1) The SeNB selects one of the cells of the SCG indicated by the MeNB.

Option 2) The SeNB selects one of the cells of a specific candidate set indicated by the MeNB.

Option 3) The MeNB selects one of the cells of the SCG which the MeNB indicates to the SeNB.

Option 4) The MeNB selects one of the cells of a specific candidate set which the MeNB indicates to the SeNB.

Figure 2:
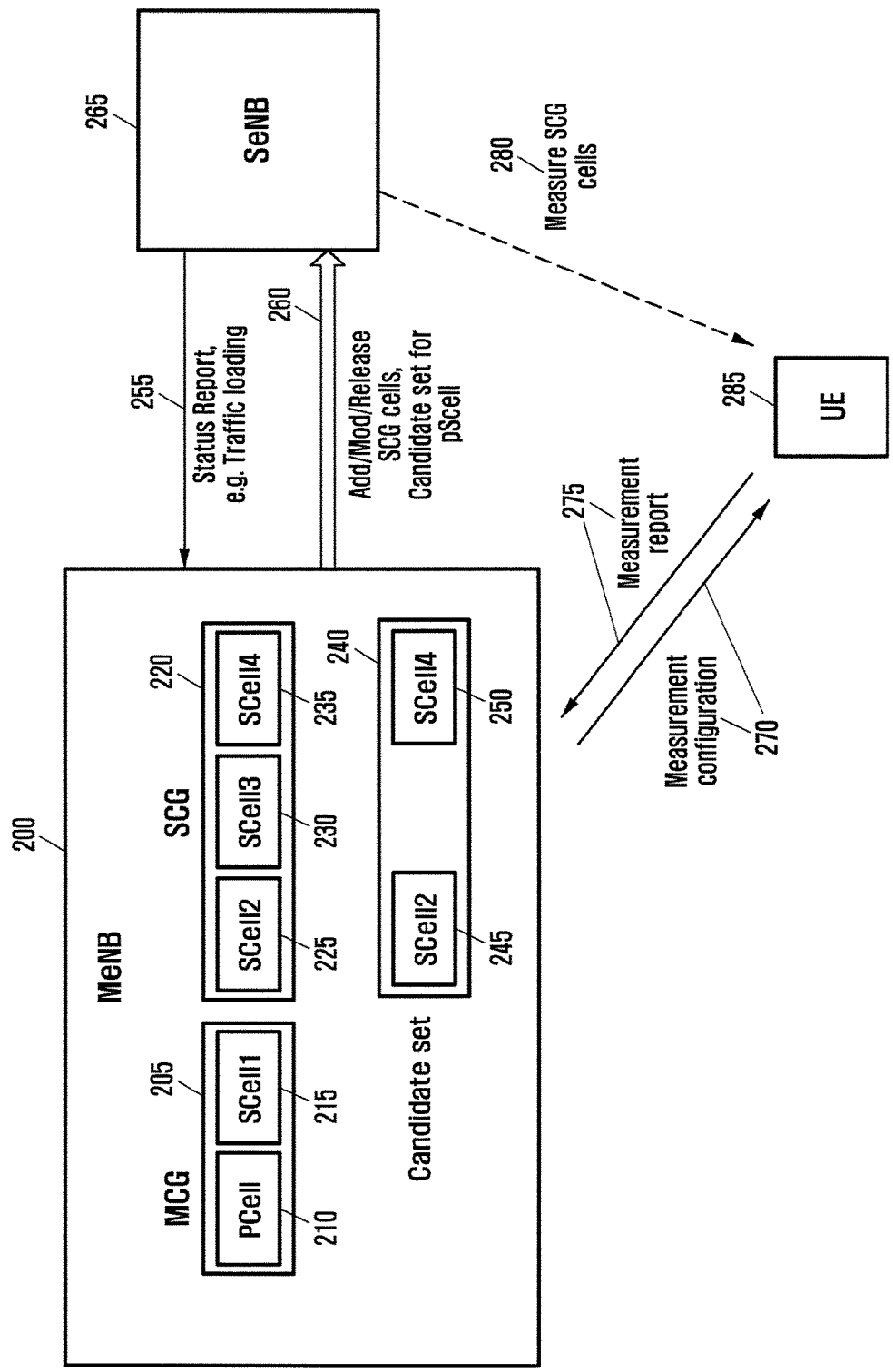
FIG. 2 illustrates an operation between a user equipment (UE) and eNBs for configuring a secondary cell group (SCG) and specific candidate set according to embodiments of the present disclosure.

FIG. 2 illustrates operation between a UE and eNBs for configuring an SCG and specific candidate set according to embodiments of the present disclosure. Referring to FIG. 2, the MeNB 200 receives SeNB status information from the SeNB 265 as denoted by reference number 255. The status information includes the information on the loads of the serving cells of the SeNB 265 in use. The MeNB 200 may send the UE 285 the measurement configuration in order for the UE 285 to measure the serving and neighboring cells and report the measurement result as denoted by reference number 270. The UE 285 performs measurement as denoted by reference number 280 and reports the measurement result to the MeNB 200 periodically or when a predetermined condition is fulfilled as denoted by reference number 275. In the legacy LTE standard, the UE reports the cell measurement result to the eNB when a predetermined condition is fulfilled.

FIG. 3 is a table listing the events triggering cell measurement reports to the eNB according to embodiments of the present disclosure. Referring to FIG. 3, each event is defined in association with a predetermined condition. If the measurement result fulfills the condition, the UE reports the corresponding measurement result to the eNB. Each condition is divided into an entering condition and a leaving condition. The entering condition corresponds to triggering the event, and the leaving condition corresponds to no longer triggering the event. The difference between the two conditions is the difference between a value obtained by subtracting a predetermined hysteresis value from a threshold value and a value obtained by adding the hysteresis value to the threshold value. This is for preventing the event from occurring to frequently in the radio environment varying abruptly in a small area as time goes.

For all the events, when the entering condition is fulfilled, the UE reports the cell measurement information to the eNB. In the case of the Event A3/A6, the UE reports the cell measurement information to the eNB even when the leaving condition is fulfilled. The MeNB determines the SCG cell 220 based on the status information provided by the SeNB 265 and the cell measurement value reported by the UE. The MeNB 200 determines to use its two cells (i.e. the PCell 210 and the SCell 215) and three serving cells 225, 230, and 235 of the SeNB 265. The MeNB 200 configures or updates the SCG of the SeNB 265 by commanding the SeNB 265 to add, modify, or release an SCG cell as denoted by reference number 260.

In the Options 2 to 4, the MeNB 200 may configure a pSCell candidate set 240. The cells included in the candidate set 240 have to be included at least in the SCG 220. That is, the candidate set 240 is a subset of the SCG 220. In FIG. 2, the two serving cells 245 and 250 of the SCG 220 are included in the candidate set 240. The candidate set 240 may be comprised of the cells with good signal strengths among the SCG cells. This is because the pSCell has to perform more functions than other SCG cells and because if the pSCell has good signal strength, this is likely to be advantageous in various aspects. For example, if the pSCell has low transmission/reception error probability as compared to other SCG cells, it is likely to increase the probability for the UE to succeed the transmission of the control signal on the PUCCH of the pSCell. Throughout transmission/reception performance of the SCG cell is maintained above a predetermined level.

In embodiments of the present disclosure, the MeNB 200 notifies the SeNB 265 of a set of the cells fulfilling a predetermined condition among the cells of the SCG 220 such that the SeNB 265 selects the pSCell in consideration of predetermined supplementary information. The set (candidate set) is a subset of the SCG 220. The predetermined condition may be whether the received signal quality (e.g. Reference Signal Received Power (RSRP) or Reference Signal Received Quality (RSRQ)) is greater than a predetermined threshold value. If the candidate set 240 is identical with the SCG 220, the MeNB 200 may not inform the SeNB 265 of the candidate set 240 explicitly. That is, if the pSCell candidate set is identical with the SCG 220, the process in which the MeNB 200 notifies the pSCell candidate set of the SeNB may be omitted. In embodiments of the present disclosure, the SeNB 265 determines the pSCell in the candidate set based on at least one of: a per-cell load, a traffic amount, an available radio resource amount, and CQI.

Descriptions are made of the per-option operations in detail hereinafter. Option 1 is that the SeNB selects one of the SCG cells indicated by the MeNB.

Figure 4:
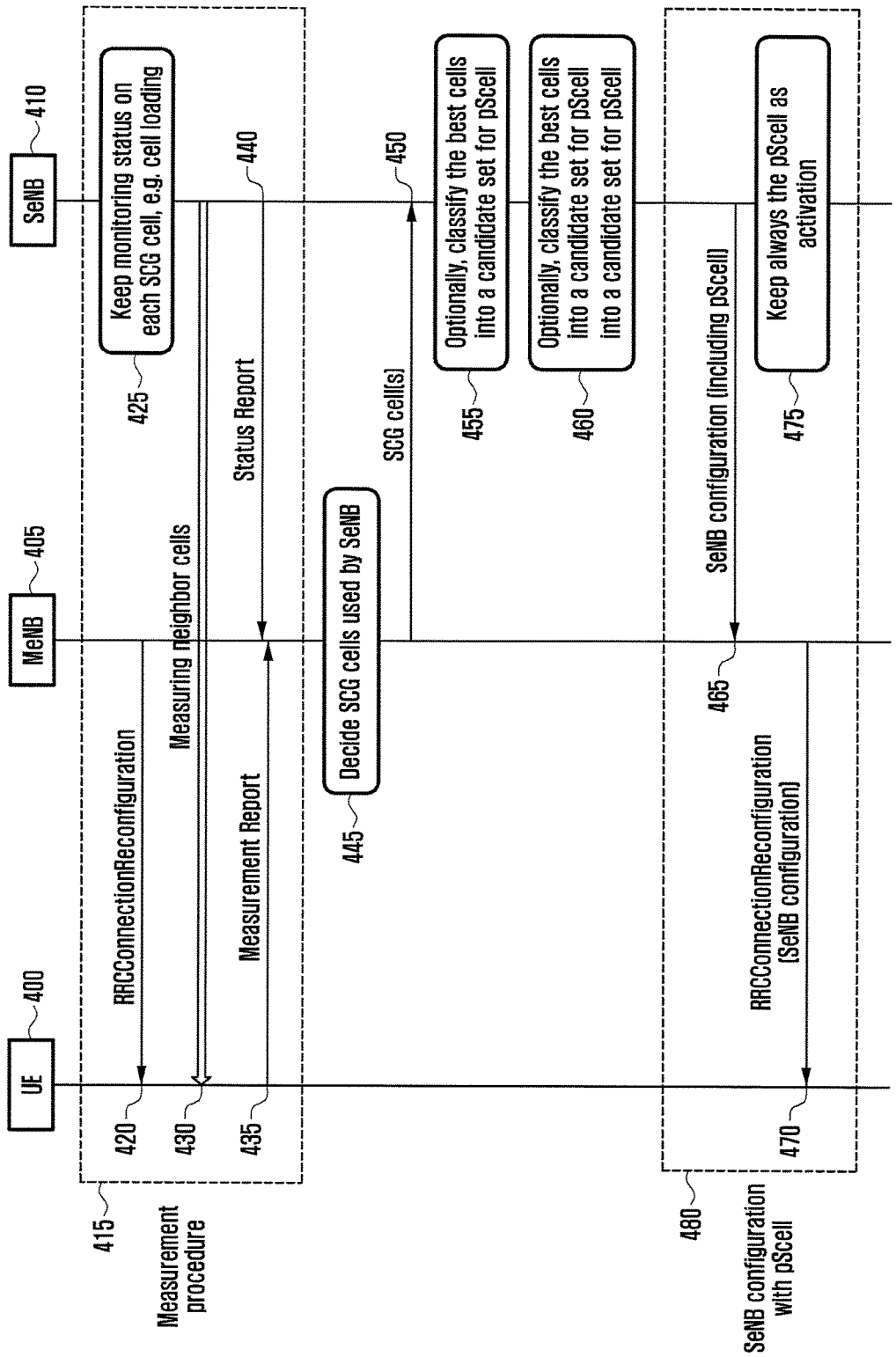
FIG. 4 illustrates a signal flow diagram of a PCell selection procedure based on the option 1 according to embodiments of the present disclosure.

FIG. 4 illustrates a signal flow diagram of a PCell selection procedure based on the option 1 according to embodiments of the present disclosure. Referring to FIG. 4, the MeNB 405 collects predetermined information from the UE 400 and the SeNB 410 to determine a Secondary Cell Group (SCG). The MeNB 405 requests the UE 400 for serving and neighbor cells measurement information and the SeNB 410 for SeNB status information as denoted by reference number 415. The MeNB 405 sends cell measurement configuration information to the UE 400 using a Radio Resource Control (RRC) Connection Reconfiguration (RRCConnectionReconfiguration) message at step 420. The UE 400 performs cell measurement according to the configuration information at step 430. The UE 400 reports the measurement result to the MeNB 405 periodically or in an event-triggered manner using a Measurement Report message at step 435.

Meanwhile, the SeNB 410 continuously monitors the SCG cells to collect the SeNB status information at step 425. The SeNB status information includes cell load information and current radio resource use amount. The SeNB status information is sent to the MeNB 405 at step 440. The MeNB 400 determines the SCG cells of the SeNB 410 for use in service based on the information collected from the UE 400 and the SeNB 410 at step 445.

In order to determine the SCG cells at a suitable timing, the UE 400 reports the cell measurement report to the MeNB 405 when a predetermined event occurs. Typically, the MeNB 405 may use legacy measurement events to configure the SCG cells. For example, Event A4 from Table 3 may be used for adding a new serving cell, Event A2 for releasing a cell from the SCG, and Event A6 for supporting inter-frequency SCG mobility. That is, the MeNB 405 may configure Event A4 to the UE 400 and thus, if there is any cell fulfilling a condition associated with a predetermined threshold value among the neighboring cells, the UE 400 reports the cell measurement result to the MeNB 405. The MeNB 405 may determine to add the cell fulfilling the condition associated with the threshold value to the SCG in consideration of additional information. The MeNB 405 commands the SeNB 410 to add the cell to the SCG at step 450.

In Option 1, the SeNB 410 determines the pSCell. The SeNB 410 determines one of the SCG cells informed by the MeNB 405 as the pSCell according to a predetermined rule. At this time, the SeNB 410 may select a few candidate cells fulfilling a predetermined condition among the SCG cells at step 455 and then determine one of the candidate cells as the PCell at step 460. It is also possible for the SeNB 410 to select one of the all SCG cells as the pSCell.

In order to select one of the SCG cells, the SeNB 410 may use various supplementary information. It is a simple method to select one of the SCG cells randomly. However, the random selection is inefficient. In order to select the pSCell more efficiently, the SeNB 410 may consider the cell loads of the respective SCG cells. It is not preferably to select the cell with a high load condition and radio resource shortage. The SCG cell with relatively good signal strength can be selected as the pSCell.

In order to achieve this, the SeNB 410 has to know the received signal qualities of the respective SCG cells. The SeNB 410 may receive the received signal quality information of the SCG cells from the MeNB 405 or collect the information by itself. In the case that the received signal quality information are provided by the MeNB 405, the information may be reported by the UE. A received signal quality information may be the RSRP or RSRQ of each SCG cell. However, if the MeNB 405 provides the SeNB 410 with the received signal quality information, this increases the information exchange traffic between the MeNB 405 and the SeNB 410.

The SeNB 410 may collect the received signal equality information of the SCG cells by itself. It is impossible for the SeNB 410 to receive the cell measurement result from the UE. This is because, in the LTE standard, the UE 400 in the dual connectivity mode can report the cell measurement result to only the MeNB 405. However, the UE may provide the SeNB 410 with other information that can be used for estimating the received signal quality. A representative one of such information is Channel Quality Indicator (CQI). The CQI indicates a data rate that the UE 400 supports in downlink. That is, if the CQI indicates a high data rate, this means that the downlink signal quality is good.

According to embodiments of the present disclosure, the SeNB 410 selects one of the cells belonging to an SCG from a predetermined candidate set as the pSCell based on the cell loads of the SCG cells or CQI. If the pSCell is determined, the SeNB 410 notifies the UE 400 of the pSCell via the MeNB 405 as denoted by reference number 480. The SeNB 410 sends, to the MeNB 405, the SeNB configuration information including the pSCell information at step 465. The pSCell remains in the activated state at step 475. The MeNB 405 sends the UE 400 an RRC Connection Reconfiguration (RRCConnectionReconfiguration) message including the pSCell information at step 470. The PCell information is described in more detail below. The UE 400 sends the SeNB 410 the control information on the PUCCH of the pSCell.

Figure 5:
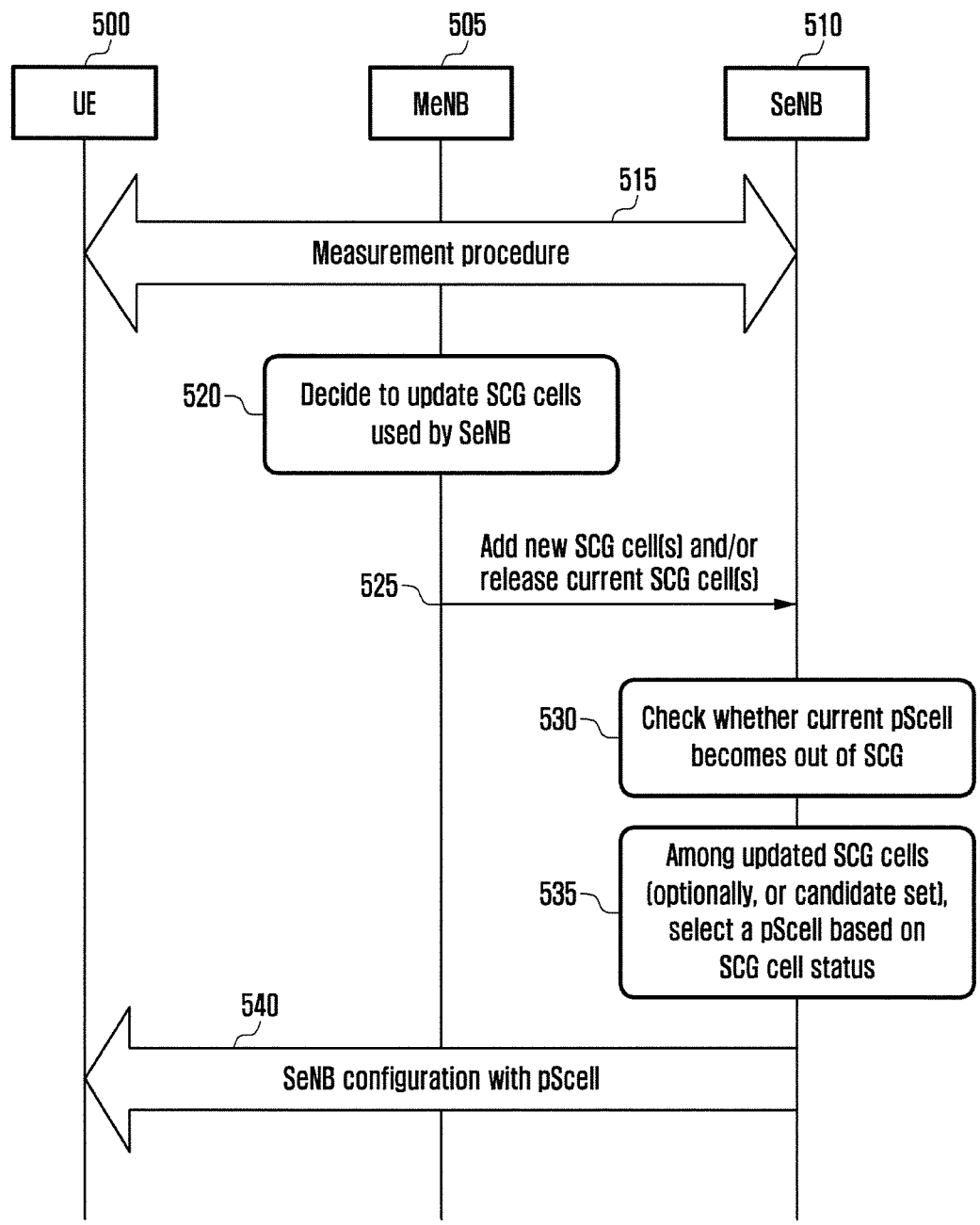
FIG. 5 illustrates a signal flow diagram of a PCell change procedure based on the option 1 according to embodiments of the present disclosure.

FIG. 5 illustrates a signal flow diagram of a PCell change procedure based on the option 1 according to embodiments of the present disclosure. In the embodiment of FIG. 5, in step 515, the UE 500, MeNB 505, and SeNB 510 operate as described in the process 415 of FIG. 4. The MeNB 505 determines whether it is necessary to update the SCG of the SeNB 510 in use at step 520. For example, if a certain cell of the SCG does not fulfill the minimum signal strength requirement or if the cell load of the SeNB 510 drops and thus SCG cells are redundant, the MeNB 505 may determine to release some SCG cells. If is the MeNB 505 determines to update the SCG, the MeNB 505 adds or releases at least one cell to or from the SCG at step 525. The SeNB 510 updates the SCG and determines whether the released cell is the pSCell at step 530. If the released cell is the pSCell, the SeNB 510 selects a new SCG cell as the pSCell at step 535. The SeNB 510 notifies the UE 500 of the newly selected pSCell via the MeNB 505 at step 540.

Figure 6:
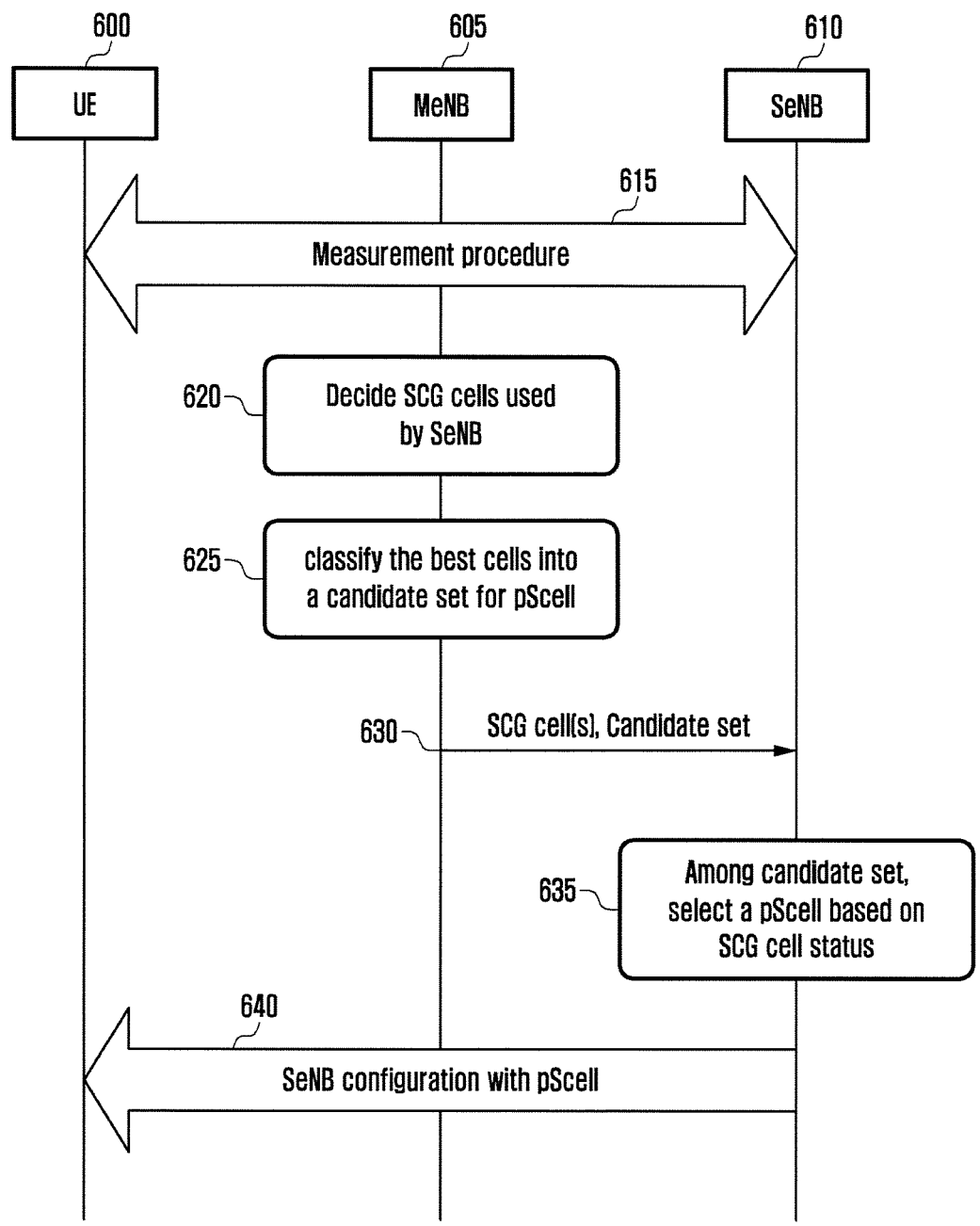
FIG. 6 illustrates a signal flow diagram of a pSCell selection procedure based on the option 2 according to embodiments of the present disclosure.

FIG. 6 illustrates a signal flow diagram of a pSCell selection procedure based on the option 2 according to embodiments of the present disclosure. Referring to FIG. 6, in step 615, the UE 600, MeNB 605, and SeNB 610 operate as described in the process 415 of FIG. 4. The MeNB 605 configures a SCG composed of the cells of the SeNB 610 at step 620. The MeNB 605 determines a pSCell candidate set composed of the cells belonging to the SCG at step 625. That is, the candidate set is a subset of the SCG. The MeNB 650 may configure the candidate set with the cells having good signal strengths among the SCG cells.

In order to configure the candidate set, the UE 600 reports the cell measurement result to the MeNB 605 in an event-triggered manner. Suppose that the MeNB 605 configures the candidate set with the serving cells fulfilling a predetermined received signal quality condition among the SCG cells. The received signal quality threshold value for determining the candidate cell may be higher than the threshold value for determining the SCG cell.

In order to maintain the candidate set, the UE reports the cell measurement result to the MeNB whenever detecting a serving cell that fulfills the received signal quality condition for candidate or does not fulfill the conditions any longer. For this purpose, it is necessary to check whether the measurement event of the legacy LTE standard can be used. One method is to configure Events A1 and A2 with thresholds, which differ from those for the legacy use, to the UE. This means to configure Events A1 and A2 with thresholds for use in candidate set management in addition to Events A1 and A2 for use in SCG management purpose. However, this method has a shortcoming in that the cell measurement configuration information transmitted from the eNB to the UE increases.

Another method is for the UE 600 to report the cell measurement result to the eNB when a leaving condition is fulfilled in association with Event A1. This is advantageous in that the configuration information does not increase. It is also possible to use the status information provided by the SeNB 610 additionally. The MeNB 605 sends, to the SeNB 610, the SCG information and the candidate set information generated as above at step 630. The SeNB 610 determines one of the cells included in the candidate set as the pSCell at step 635. As described above, the SeNB 610 determines the pSCell based on the cell load, available radio resource amount, and scheduling information on the current serving cells. The SeNB 610 sends the UE 600 the PCell information via the MeNB 605 at step 640.

The pSCell is selected among the serving cells of the SCG and has PUCCH. The PUCCH carries HARQ ACK/NACK, CSI, and SR that are transmitted from the UE to the eNB. It does not prefer to change the pSCell in view of system management. If the pSCell is changed frequently, traffic increases between the UE and the eNB, resulting in network overload. According to embodiments of the present disclosure, options 2 and 4 are characterized by configuration of a candidate set for selecting the pSCell so as to mitigate the aforementioned problem.

In the case of option 2 where the SeNB 610 selects the pSCell by itself, it is necessary to acquire the cell measurement information of the respective SCells of the eNB. Since the UE 600 does not provide the SeNB the cell measurement information, the SeNB receives the cell measurement information from the MeNB 506, and this increases network load. According to embodiments of the present disclosure, the MeNB 605 configures the candidate set based on the cell measurement information provided by the UE 600 and notifies the SeNB of this such that the SeNB can select the pSCell from the candidate set composed of the cells of which signal strengths are equal to or greater than a predetermined threshold without receipt of extra cell measurement information from the MeNB.

If the candidate set information is received, the SeNB 610 may use the candidate set depending on the case. If the MeNB 605 updates the candidate set, the candidate set which is stored in the MeNB 605 or which has been transmitted to the SeNB 610 is not used for selecting the pSCell. Although there is no update of the candidate set, if an event triggering the change of the pSCell of the SeNB, the SeNB 610 may select one of the SCells belonging to the candidate set stored or received previously as a new pSCell. That is, when a pSCell change event occurs, the SeNB 610 may perform pSCell reselection in the candidate set stored or received previously without performing the entire process for selecting the pSCell unless the candidate set is changed. In this way, it is possible to reduce the traffic load of the network.

Figure 7:
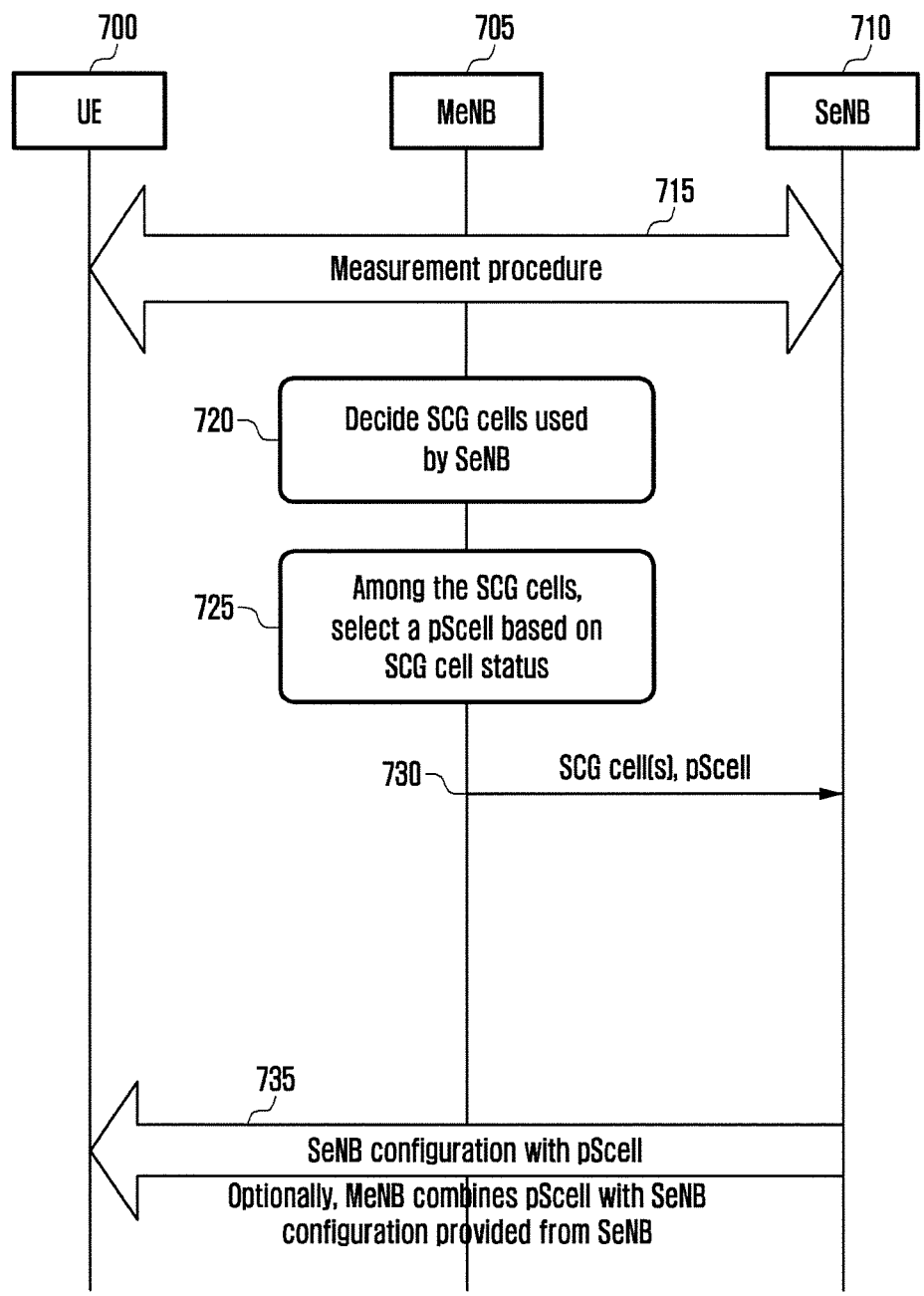
FIG. 7 illustrates a signal flow diagram of a pSCell selection procedure based on the option 3 according to embodiments of the present disclosure.

FIG. 7 illustrates a signal flow diagram of a pSCell selection procedure based on the option 3 according to embodiments of the present disclosure. Referring to FIG. 7, in step 715, the UE 700, MeNB 705, and SeNB 710 operate as described in the process 415 of FIG. 4. The MeNB 705 configures an SCG composed of the cells of the SeNB 710 at step 720. The MeNB 705 determines one of the cells of the SCG as the pSCell at step 725. In order to determine the pSCell, the MeNB 705 has to have the all the information necessary for pSCell determination.

The MeNB 705 notifies the SeNB 710 of the SCG and pSCell at step 730. The SeNB 710 generates the SeNB configuration information including pSCell indicator and information on the PCell and sends the generated information to the UE 700 via the MeNB 705 at step 735. Since the MeNB 705 determines the pSCell, it is possible for the MeNB 705 to generate the pSCell information and send the pSCell information to the UE 700. However, other pSCell-related information is still generated by the SeNB 710.

Figure 8:
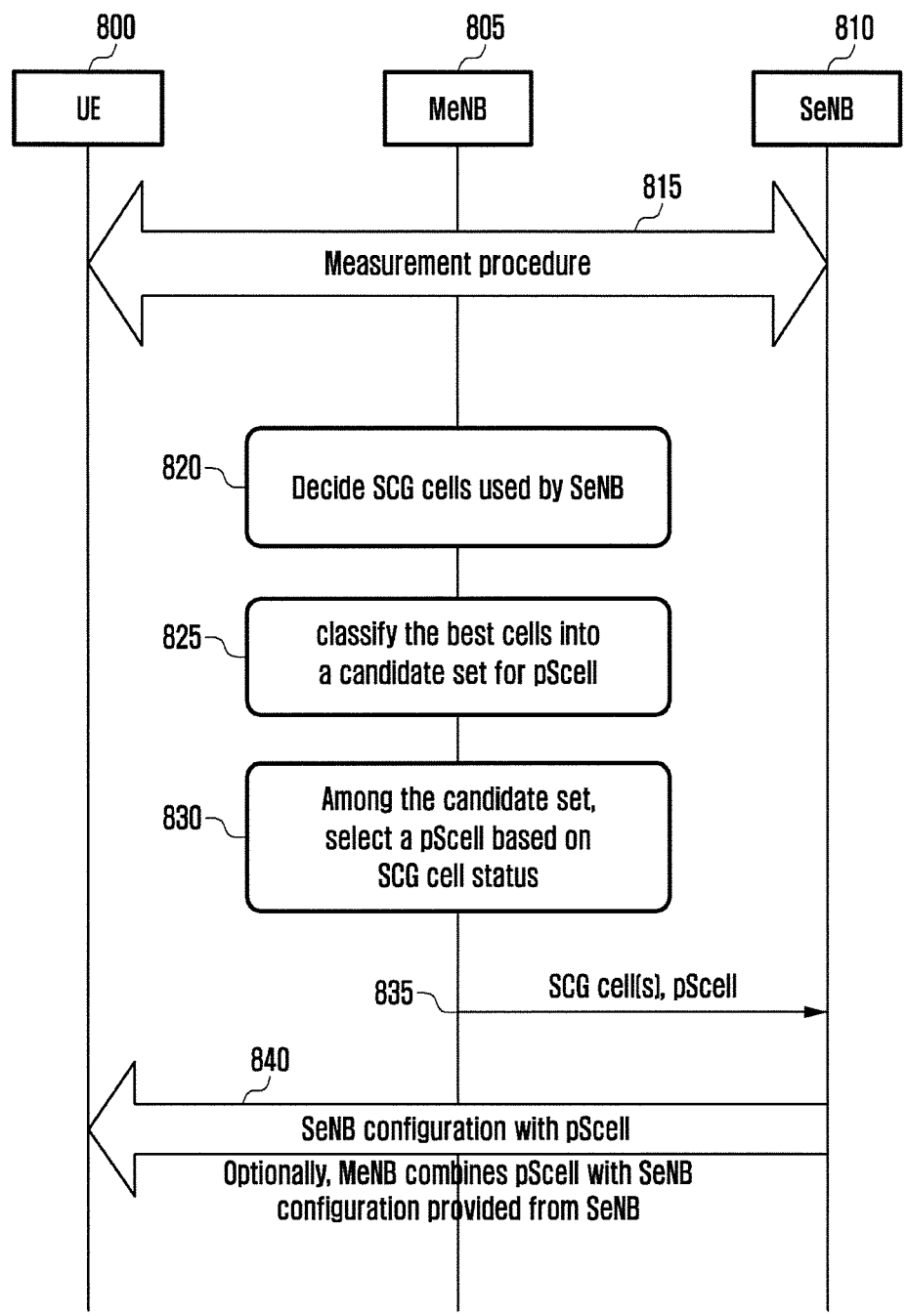
FIG. 8 illustrates a signal flow diagram of a pSCell procedure based on the option 4 according to embodiments of the present disclosure.

FIG. 8 illustrates a signal flow diagram of a pSCell procedure based on the option 4 according to embodiments of the present disclosure. Referring to FIG. 8, the UE 800, MeNB 805, and SeNB 810 operate as described in the process 415 of FIG. 4 at step 815. The MeNB 805 configures an SCG composed of the cells of the SeNB 810 at step 820. The MeNB 805 determines a pSCell candidate set of SCG cells at step 825. The candidate set may be determined as described with reference to FIG. 6. The MeNB 805 determines one of the SCG cells of the candidate set as the pSCell at step 830. The MeNB 805 notifies the SeNB 810 of the SCG and the pSCell at step 835. The SeNB 810 generates the pSCell information, which is transmitted to the UE 800 via the MeNB 805 at step 840. This is similar to step 735 of FIG. 7.

Figure 9:
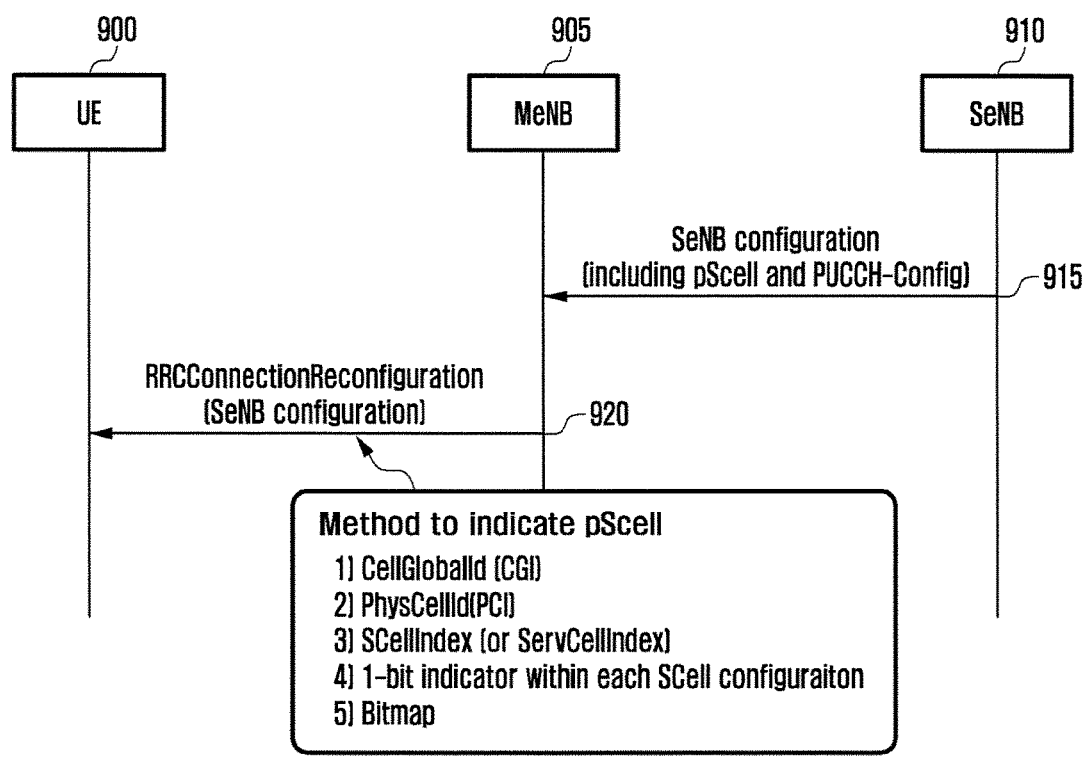
FIG. 9 illustrates a signal flow diagram of a procedure of delivering the pSCell information to the UE according to embodiments of the present disclosure.

FIG. 9 illustrates a signal flow diagram illustrating a procedure of delivering the pSCell information to the UE according to embodiments of the present disclosure. Referring to FIG. 9, when the SeNB 910 determines the pSCell according to option 1 or option 2, any pSCell indication information has to be included in the SeNB configuration information which is transmitted from the SeNB 910 to the MeNB 905 at step 915. This process is valid either in option 3 or option 4. One of the main characteristics of the pSCell is that it has PUCCH. Accordingly, the SeNB configuration information may include the pSCell PUCCH configuration information (PUCCH-Config IE). The MeNB 905 sends the UE 900 a RRC Connection Reconfiguration (RRCConnectionReconfiguration) message including this information at step 920. It is important to notify the UE 900 of which is the pSCell among the SCG cells. This embodiment is characterized in that one of the following information is used to indicate the pSCell.

CellGlobalId (CGI): Unique cell ID. The CGI is comprised of PLMN ID, eNB ID, and Cell ID. Identical with the IE specified in 3GPP standard TS36.331.

PhysCellId (PCI): This is an ID identifying the physical layer of a cell and can be reused in other cells. Identical with the IE specified in 3GPP standard TS36.331.

SCellIndex (or ServCellIndex)-based: Since the pSCell is one of SCells, it is allocated an SCellIndex value for use in SCell identification. The SCellIndex is an integer value in the range from 1 to 7. The eNB uses the SCellIndex of the pSCell to notify the UE of the pSCell. For example, if the SCellIndex of the pSCell is set to 2, the Information Element (IE) which is newly defined to indicate pSCell has the value of 2. This IE is included in the RRCConnectionReconfiguration message transmitted at step 920.

1-bit indicator within each SCell configuration: The eNB provides the UE with per-SCell configuration information. The 1-bit indicator is defined in the per-SCell configuration information and set to TRUE for indicating a SCell as the pSCell. For example, this indicator may be included in the SCellToAddMod IE.

Bitmap: A bitmap mapping SCells to bits in order is defined such that the bit corresponding to the pSCell is set to 1.

Figure 10:
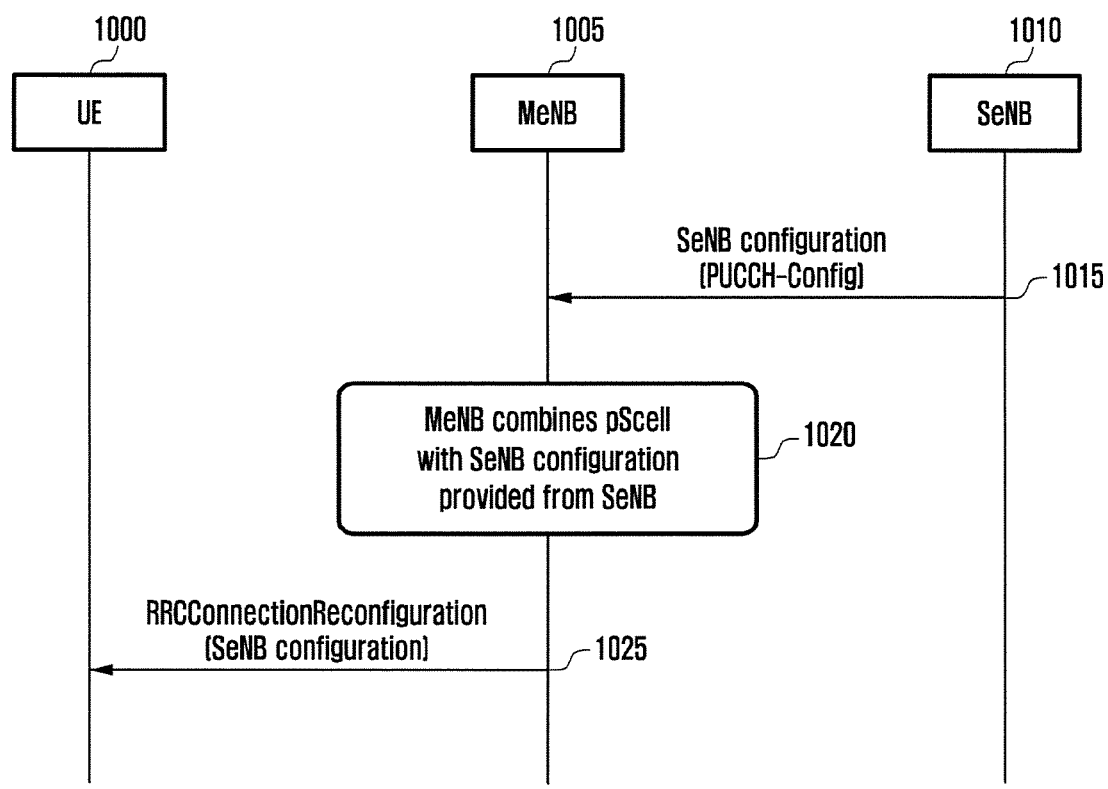
FIG. 10 illustrates a signal flow diagram of a pSCell information notification procedure of the MeNB according to embodiments of the present disclosure.

FIG. 10 illustrates a signal flow diagram of a pSCell information notification procedure of the MeNB according to embodiments of the present disclosure. Referring to FIG. 10, the MeNB 1005 determines the pSCell based on the option 3 or 4 and notifies the UE 1000 that which SCG cell is the pSCell. The SeNB 1010 sends the MeNB 1005 the SeNB configuration information at step 1015. Although the pSCell is not determined by the SeNB 1010, the SeNB 1010 has to configure the PUCCH of the pSCell. The SeNB configuration information includes the pSCell PUCCH configuration information. The MeNB 1005 generates the RRC Connection Reconfiguration (RRCConnectionReconfiguration) message including the SeNB configuration information and the pSCell indication information 1020 and transmits the RRC Connection Reconfiguration message to the UE 1000 at step 1025.

Embodiment 2

This embodiment proposes a method for conserving power consumption of the UE in the carrier aggregation or dual connectivity mode using multiple serving cells. In order to save the power consumption of the UE in the connected mode, which is configured to perform cell measurement, the UE performs cell measurement only when a predetermined condition is fulfilled other than continuously. If S-Measure IE is included in the cell measurement configuration information, the UE performs intra-frequency, inter-frequency, and/or inter-RAT measurement only when the Reference Signal Received Power (RSRP) of the PCell is less than the value indicated by the S-Measure.

Figure 11:
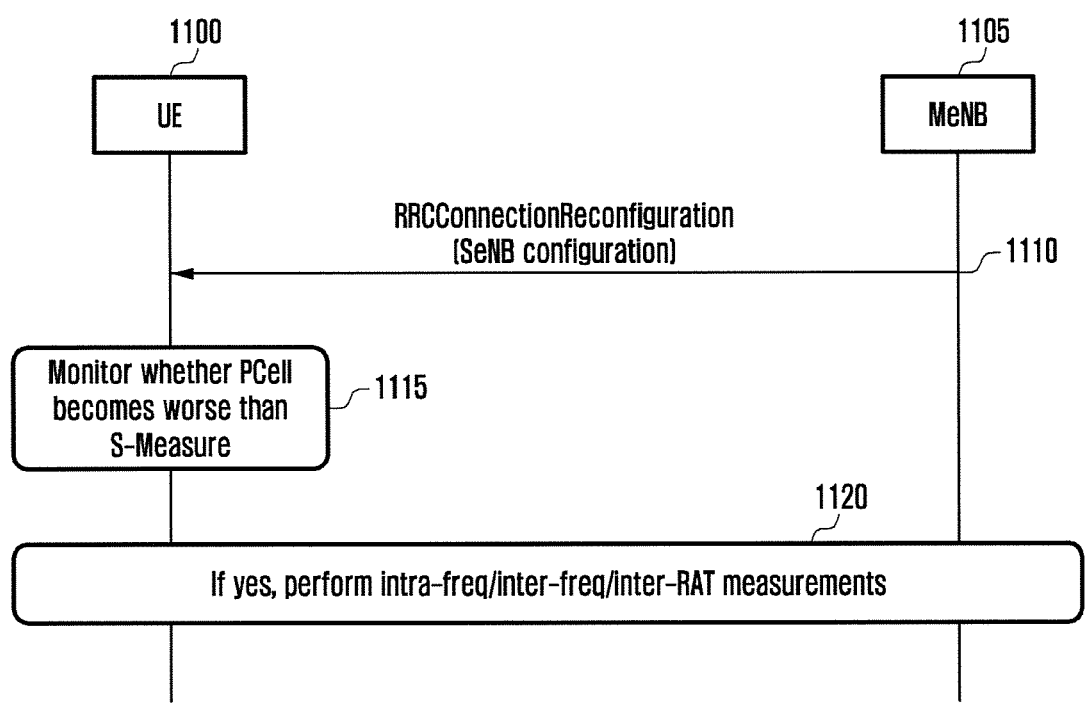
FIG. 11 illustrates a signal flow diagram of a procedure of applying S-Measure according to a LTE standard technical specification.

FIG. 11 illustrates a signal flow diagram of a procedure of applying S-Measure in LTE standard technical specification. Referring to FIG. 11, the MeNB 1105 sends the UE 1100 the cell measurement configuration information including the S-Measure using the RRC Connection Reconfiguration (RRCConnectionReconfiguration) message at step 1110. The UE 1100 determines whether the RSRP of the PCell is less than the value indicated by the S-Measure at step 1115. If the RARP of the PCell is less than the value indicated by the S-Measure, the UE 1100 performs intra-frequency, inter-frequency, and inter-RAT measurements at step 1115. If the RARP of the PCell is equal to or greater than the value indicated by the S-Measure, the UE 1100 does not perform and y of intra-frequency, inter-frequency, and inter-RAT measurements. In this case, the UE 1100 performs just the serving measurement.

Figure 12:
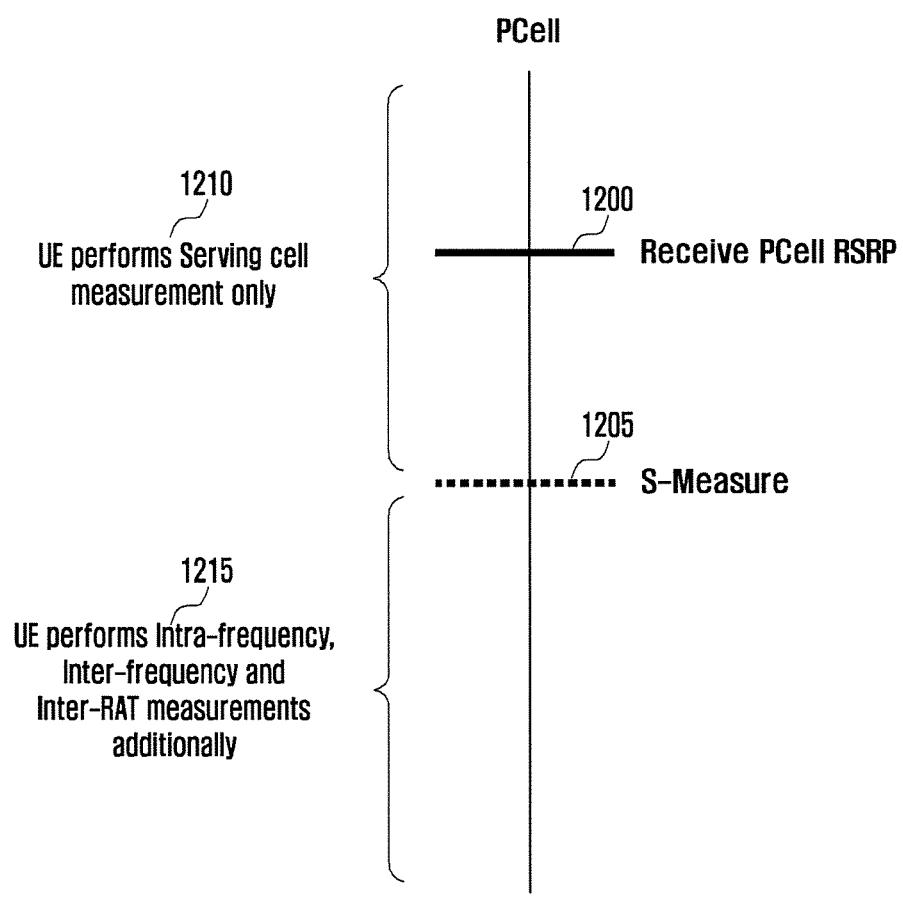
FIG. 12 illustrates a diagram for explaining the S-measure specified in the LTE standard technical specification.

FIG. 12 illustrates a diagram for explaining the S-measure specified in the LTE standard technical specification. Referring to FIG. 12, if the RSRP 1200 of the PCell is greater than the value 1205 indicated by the S-Measure, the UE performs only the serving cell measurement as denoted by reference number 1210. Otherwise if the RSRP is equal to or less than the value indicated by the S-Measure, the UE performs intra-frequency, inter-frequency, and inter-RAT measurements as denoted by reference number 1215.

In the case that only the PCell exists, if the RSRP of the PCell is good, there is no need for cell measurement result for handover. In this case, the UE may skip unnecessary cell measurement to save power consumption of the UE. However, there is a problem in that it is difficult to apply the S-Measure to the dual connectivity technique or the carrier aggregation technique in which multiple serving cells are participating.

Figure 13:
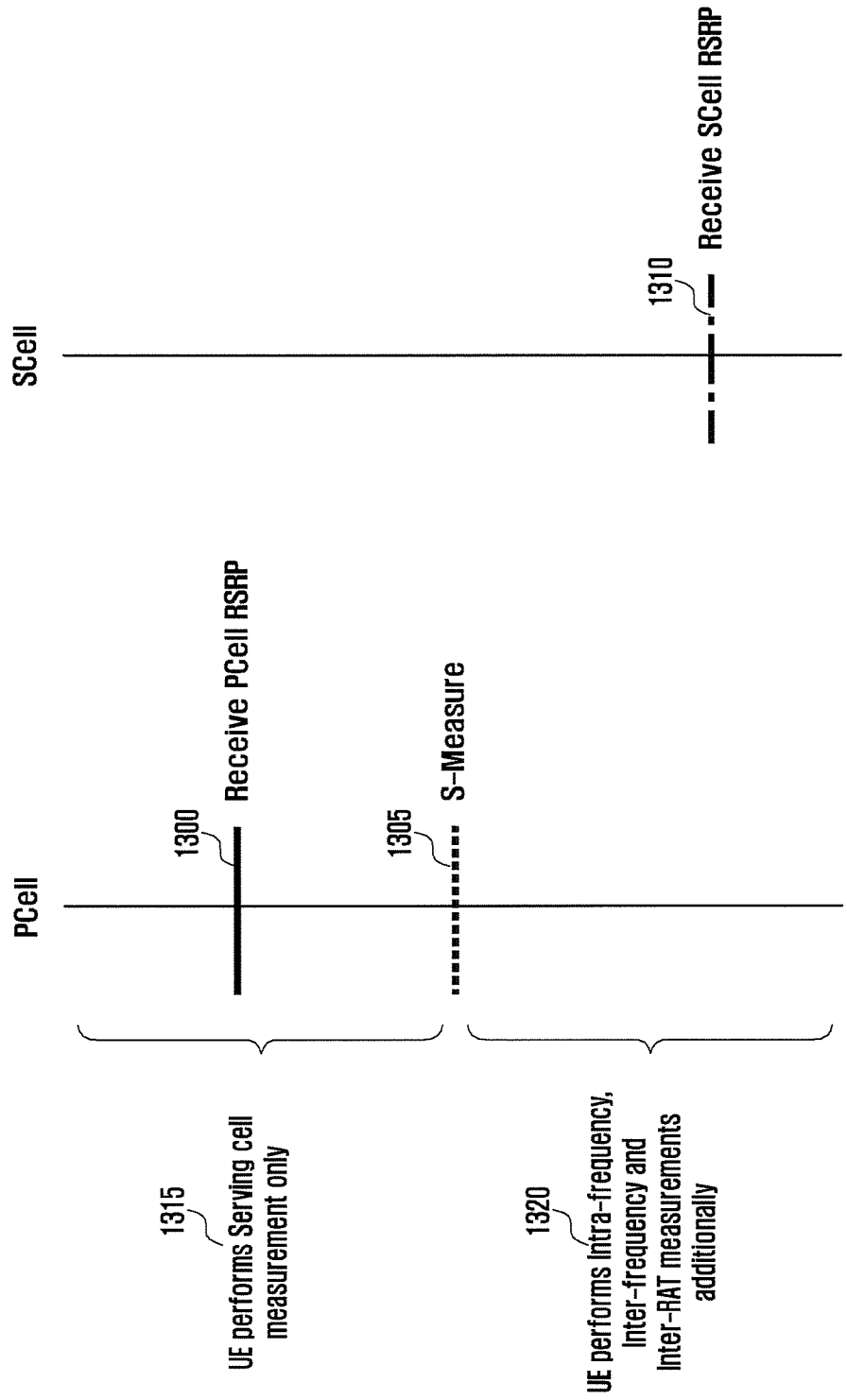
FIG. 13 illustrates a diagram for explaining the problem likely to occur in applying the S-Measure to the dual connectivity or carrier aggregation technique.

FIG. 13 illustrates a diagram for explaining the problem likely to occur in applying the S-Measure to the dual connectivity or carrier aggregation technique. For example, the UE transmits/receives data through the PCell and SCell in FIG. 13. The RSRP 1300 of the PCell is greater than the S-Measure 1305. However, the RSRP 1310 of the SCell is less than the S-Measure 1305 and has poor signal strength. In this case, it is necessary to change the SCell for new serving cell.

In order to change the SCell, the UE performs intra-frequency measurement as denoted by reference number 1320 and reports the neighboring cell measurement result to the eNB. However, since the RSRP of the PCell is greater than S-Measure, the UE performs only the serving cell measurement. Accordingly, although the signal strength of the SCell drops below a predetermined threshold value so as to trigger Event A2 to report the measurement report, the measurement result of the suitable neighboring cell is not likely to be included. The present disclosure provides a method for solving such a problem. The simplest method is to ignore the S-measurement when a specific technique is running. If the S-Measure is ignored, this means that the UE may perform intra-frequency measurement according to the RSRP of the SCell even when the RSRP of the PCell is greater than the S-measure. The UE also may perform inter-frequency and inter-RAT measurements.

Figure 14:
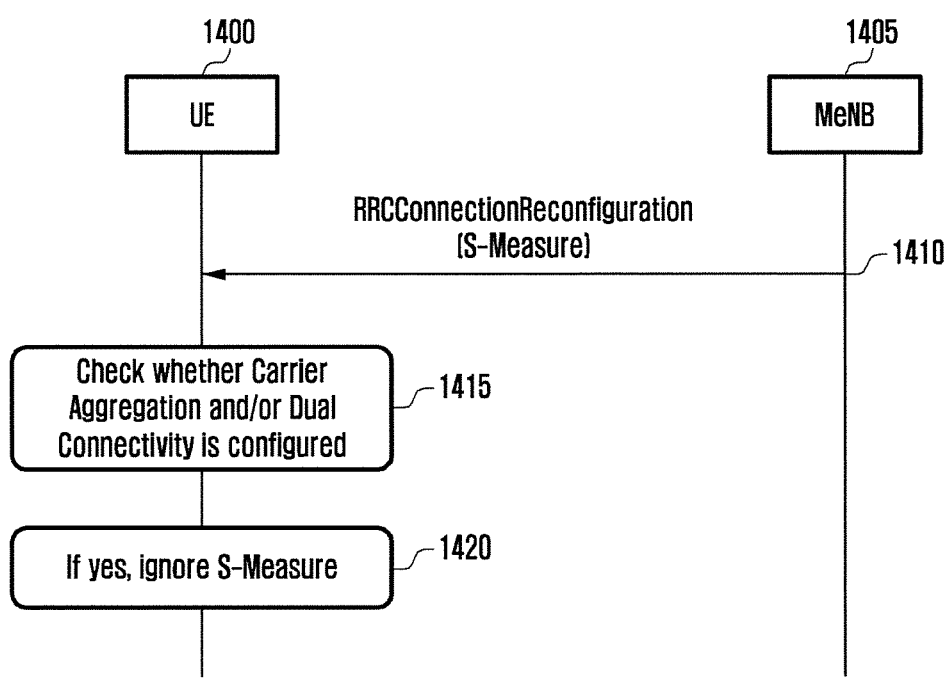
FIG. 14 illustrates a signal flow diagram of a procedure of ignoring S-Measure in association with a predetermined technique according to embodiments of the present disclosure.

FIG. 14 illustrates a signal flow diagram of a procedure of ignoring S-Measure in association with a predetermined technique according to embodiments of the present disclosure. Referring to FIG. 14, the MeNB 1405 sends, to the UE 1400, the RRC Connection Reconfiguration (RRCConnectionReconfiguration) message including the S-Measure at step 1410. The UE 1400 determines whether the UE 1400 is operating in the dual connectivity mode or the carrier aggregation mode at step 1415. If the dual connectivity mode or the carrier aggregation mode is activated, the UE 1400 ignores the S-Measure regardless of the received signal quality of the PCell at step 1420. That is, the UE 1400 may perform intra-frequency measurement even when the RSRP of the PCell is greater than the S-Measure. However, this method negates the change of saving the power consumption of the UE too. The present disclosure provides a method for the UE to perform: when a predetermined condition is fulfilled, at least the intra-frequency measurement can support SCell mobility.

Figure 15:
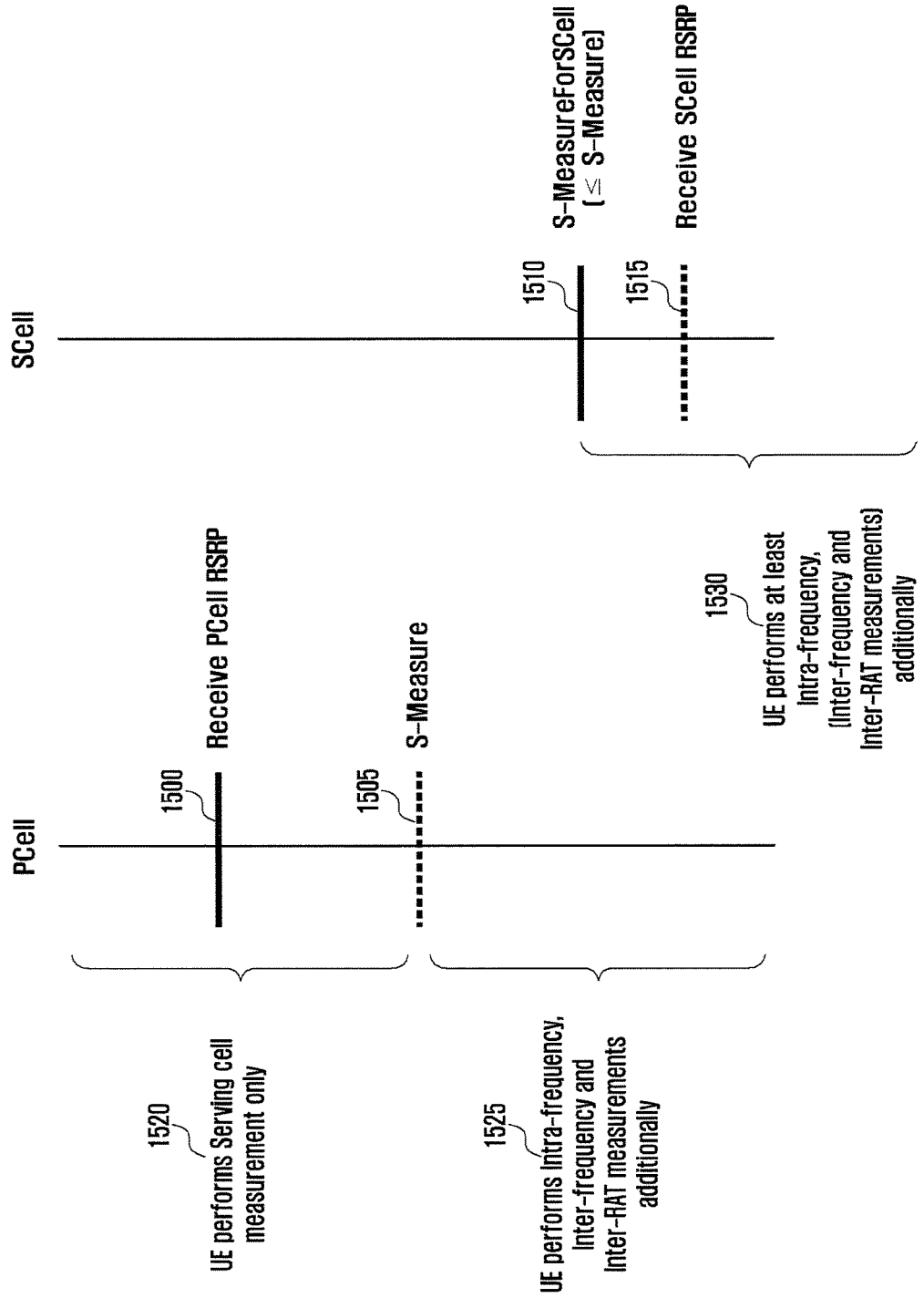
FIG. 15 illustrates cell measurement for reducing power consumption of a UE operating in the dual connectivity or carrier aggregation mode according to embodiments of the present disclosure.

FIG. 15 illustrates cell measurement for reducing power consumption of the UE operating in the dual connectivity or carrier aggregation mode according to embodiments of the present disclosure. The eNB provides the UE with two threshold values. One is the S-Measure 1500 specified in the legacy LTE standard. The other is a new threshold value 1510 to be compared with the RSRP of the SCell. This new threshold is referred to as S-MeasureForScell 1510 in the present invention. The legacy S-Measure-related operation is performed without modification. That is, if the PCell RSRP is less than the S-Measure, the UE performs intra-frequency, inter-frequency, and inter-RAT measurements as denoted by reference number 1525.

Even when another condition is fulfilled, the UE may perform the intra-frequency, inter-frequency, and inter-RAT measurements. If the SCell RSRP is less than the S-MeasureForScell, the UE may perform at least intra-frequency measurement. The inter-frequency and inter-RAT measurements may be included. Since it is to change the SCell with the poor signal strength for a neighboring cell on the same frequency, it is inevitable to perform the intra-frequency measurement. In the case that there is a plurality SCells, if the RSRP of at least SCell is less than the S-MeasureForSCell 1510, the UE performs the cell measurement.

Figure 16:
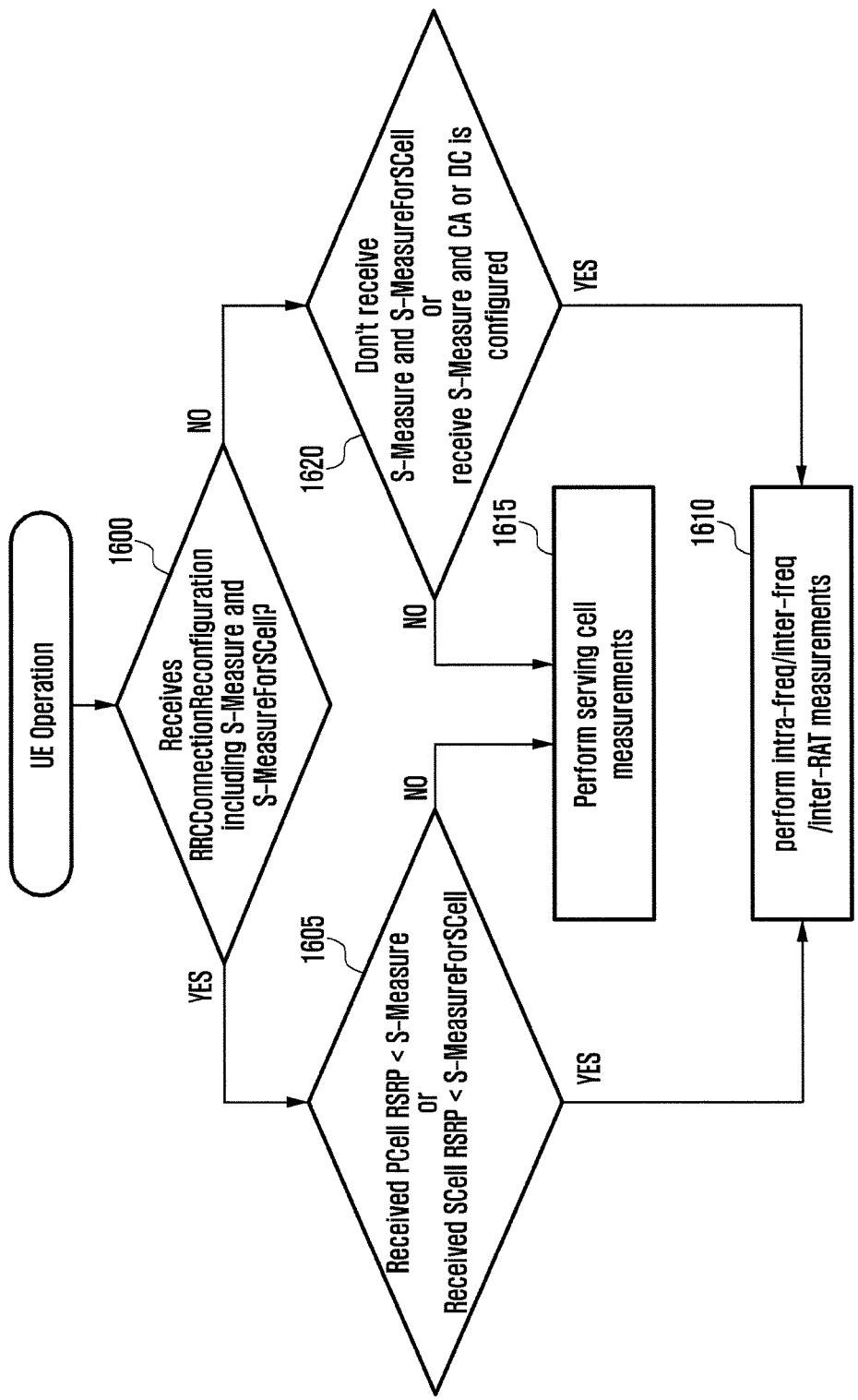
FIG. 16 illustrates the UE-side operation of the cell measurement procedure for reducing the power consumption of the UE operating in the dual connectivity or carrier aggregation mode according to embodiments of the present disclosure.

FIG. 16 illustrates a flowchart of the UE-side operation of the cell measurement procedure for saving the power consumption of the UE operating in the dual connectivity or carrier aggregation mode according to embodiments of the present disclosure. Referring to FIG. 16, the MeNB sends the UE the cell measurement configuration information including the S-Measure and S-MeasureForSCell using the RRC Connection Reconfiguration (RRCConnectionReconfiguration) message. The MeNB may transmit the cell measurement configuration information including only the S-Measurement or both the S-Measure and S-MeasureForSCell to the UE using the RRC Connection Reconfiguration information. The MeNB also may transmit the cell measurement configuration information including neither the S-Measure nor the S-MeasureForSCell using the RRC Connection Reconfiguration message. The UE determines whether the cell measurement configuration information received from the eNB includes the S-Measure at step 1600. That is, the UE determines whether the cell measurement configuration information includes only the S-Measure, both the S-Measure and S-MeasureForSCell, or none of the S-Measure and S-MeasureForSCell at step 1600.

If both the cell measurement configuration information includes both the S-Measure and S-MeasureForSCell, the UE determines whether either the PCell RSRP is less than the S-Measure or the SCell RSRP is less than the S-MeasureForSCell at step 1605 and, if so, the UE performs intra-frequency, inter-frequency, and inter-RAT measurements at step 1610. One of the conditions is related to the operation of the S-Measure specified in the legacy LTE standard. The UE determines whether the PCell RSRP is less than the S-Measure at step 1605. If the PCell RSRP is less than the S-Measure, the UE performs the intra-frequency, inter-frequency, and inter-RAT measurements at step 1610.

The UE also determines whether the SCell RSRP is less than the S-MeasureForSCell at step 1605. If the SCell RSRP is less than the S-MeasureForSCell, the UE performs at least intra-frequency measurement at step 1610. The UE may perform the inter-frequency and inter-RAT measurements additionally.

If none of the two conditions is fulfilled at step 1605, the procedure goes to step 1615. At step 1615, the UE performs only the cell measurement on the current serving cell.

If the cell measurement configuration information received through the RRC Connection Reconfiguration message does not include the S-Measure and S-MeasureForSCell, the procedure goes to step 1620. At step 1620, the UE determines whether the following two conditions are fulfilled.

The UE determines whether neither of the S-measure nor S-MeasureForSCell is received at step 1620 and, if none of the S-measure and S-MeasureForSCell is received, performs the intra-frequency measurement at step 1610. The UE also may perform the inter-frequency and inter-RAT measurements additionally.

If only the S-Measure is received at step 1620 and if the dual connectivity or carrier aggregation is configured, the procedure goes to step 1610. At step 1610, the UE performs the intra-frequency measurement. The UE also may perform the inter-frequency and inter-RAT measurements additionally.

If none of the two conditions is fulfilled at step 1620, the procedure goes to step 1615. At step 1615, the UE performs only the cell measurement on the current serving cell.

Figure 17:
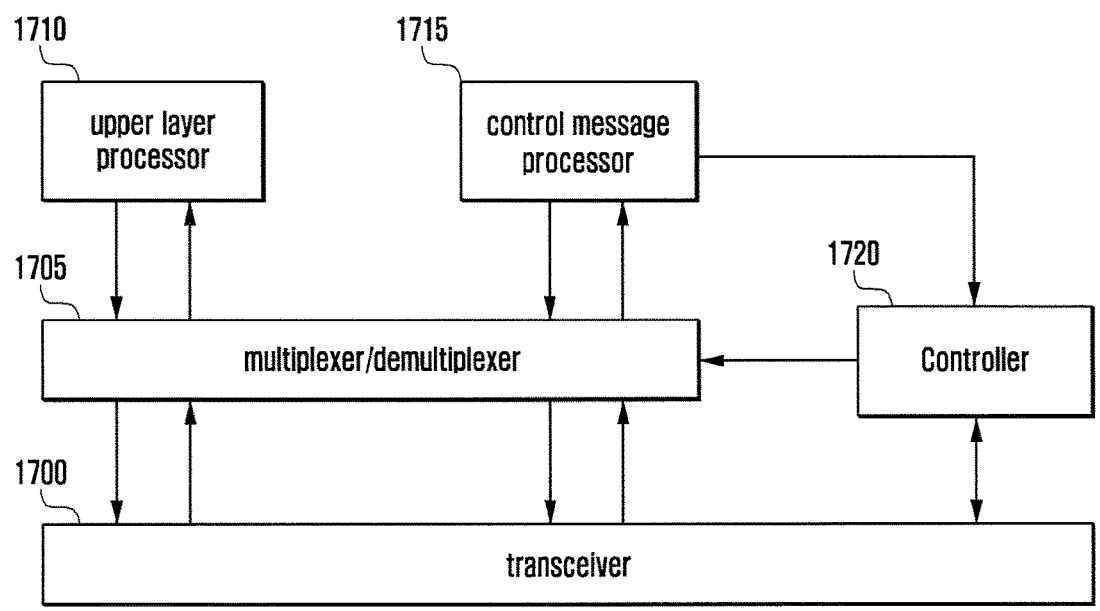
FIG. 17 illustrates a configuration of the UE according to embodiments of the present disclosure.

FIG. 17 illustrates a block diagram of a configuration of the UE according to embodiments of the present disclosure. As shown in FIG. 17, the UE according to embodiments of the present disclosure includes a transceiver 1700, a multiplexer/demultiplexer 1705, an upper layer processor 1710, a control message processor 1715, and a controller 1720. In the case of transmitting control signals and/or data to the eNB, the UE multiplexes the controls signals and/or data by the multiplexer/demultiplexer 1705 and transmits the multiplexed signal by way of the transceiver 1700 under the control of the controller 1720. In the case of receiving signals, the UE receives a physical signal by the transceiver 1700, demultiplexes the received signal by the multiplexer/demultiplexer 1705, and delivers the demultiplexed information to the higher layer processor 1710 and/or control message processor 1715, under the control of the controller 1720.

The controller 1720 controls the overall operations of the UE. According to embodiments of the present disclosure, the controller 1720 controls the UE to perform cell measurement and report cell measurement information to the macro eNB based on the cell measurement request received from the macro eNB. The controller 1720 may control the UE to receive the eNB configuration information including the indicator indicating a specific cell of the small cell which is received from the macro eNB or the small cell eNB.

The controller 1720 also may control to transmit uplink control channel to the small cell eNB serving the UE through a specific cell indicated by the indicator.

The controller 1720 also may control the UE operations described with reference to FIGS. 1 to 16.

Although the description is made in such a way that the UE is composed of a plurality function blocks responsible for different functions, the configuration of the UE is not limited thereto. For example, the functions of the multiplexer/demultiplexer 1705 may be performed by the controller 1720.

Figure 18:
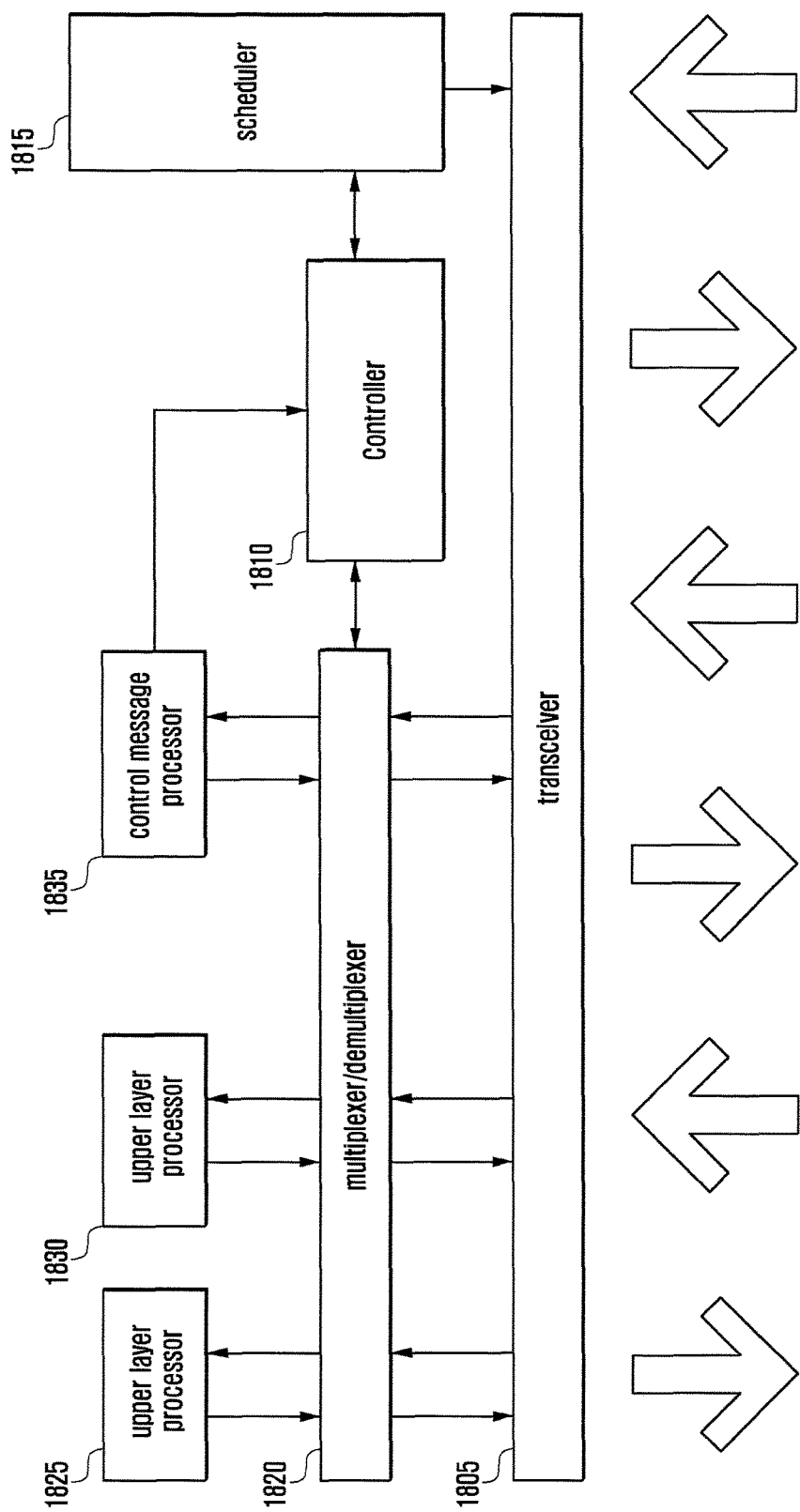
FIG. 18 illustrates a configuration of the eNB according to embodiments of the present disclosure.

FIG. 18 illustrates a block diagram of a configuration of the eNB according to embodiments of the present disclosure. As shown in FIG. 18, the eNB includes a transceiver 1805, a controller 1810, a multiplexer/demultiplexer 1820, a control message processor 1835, various upper layer processors 1825 and 1830, and a scheduler 1815.

The transceiver 1805 transmits data and predetermined control signals through a downlink channel. The transceiver 1805 receives data and predetermined control signals through an uplink channel. In the case that a plurality of carriers is configured, the transceiver 1805 transmits and receives data and control signals through the plural carriers.

The multiplexer/demultiplexer 1820 is responsible for multiplexing data generated by the upper layer processors 1825 and 1830 and the control message processor 1835 or demultiplexing data received by the transceiver 1805 to deliver the demultiplexed data to the upper layer processors 1825 and 1830, the control message processor 1835, and the controller 1810. The control message processor 1835 processes the control message transmitted by the UE to take a necessary action or generates a control message addressed to the UE to the lower layer.

The upper layer processor 1825 (or 1830) is established per UE or per service to process the data generated in association with the user service such as File Transfer Protocol (FTP) and Voice over Internet Protocol (VoIP) and transfer the processed data to the multiplexer/demultiplexer 1820 or process the data from the multiplexer/demultiplexer 1820 and transfer the processed data to the upper layer service applications.

The scheduler 1815 allocates transmission resource to the UE at an appropriate timing based on the buffer status, channel status, and Active Time of the UE and controls the transceiver 1805 to process the signals received from and to be transmitted to the UE.

The controller 1810 determines the data transmission timing of the UE and controls the transceiver 1805 to receive data. The controller 1810 controls the overall operations of the eNB. According to embodiments of the present disclosure, the controller 1810 controls the operations of the macro eNB. A description is made of the operation of the controller of the macro eNB.

The controller 1810 receives the cell measurement information about the serving and neighboring cells from at least one UE served by the macro eNB. The controller 1810 receives the status information including the load information on the serving cells of the small cell eNB from the small cell eNB. The controller 1810 determines the Secondary Cell Group (SCG) of the serving cells of the small cell eNB that are capable of serving the UE based on the cell measurement information and the status information. The controller 1810 controls to transmit the SCG information to the small cell eNB. At this time, the SCG information can be used when the small cell eNB selects a specific cell for PUCCH transmission of the UE.

The controller 1810 also may control to configure a specific cell candidate set with the cells of which signal strengths are equal to or greater than a predetermined threshold among the serving cells included in the SCG. The controller 1810 also may control to select the specific cell among the at least one cell included in the candidate set.

The controller 1810 may control to transmit the specific cell candidate set information to the small cell eNB for use in selecting the specific cell. If the SCG is identical with the candidate set, the controller 1810 may control to do not transmit the candidate set information.

The controller 1810 also may control to receive the small cell eNB configuration information including an indicator indicating the specific cell from the small cell eNB and to transmit the configuration information including the indicator to the UE. At this time, the indicator may include one of the CellGlobalID, PhysCellId, SCellIndex, bit indication information, and bitmap information.

A description is made of the operation of the controller of the small cell eNB. The controller 1810 may control the small cell eNB to receive the information on the Secondary Cell Group (SCG) including the serving cells through which the small cell eNB is capable of serving the UE from the macro eNB and to select a specific cell for the UE to transmit PUCCH based on the received SCG information.

The controller 1810 also may control the small cell eNB to determine the specific cell based on the per-cell received reference signal strength, received reference signal quality and/or the cell measurement result received from the UE.

The controller 1810 also may control the small cell eNB to receive the information on the candidate set composed of the cells of which signal strengths are equal to or greater than a predetermined threshold value among the serving cells included in the SCG from the macro eNB and to select the specific cell based on the received candidate set information. The controller 1810 also may control the small cell eNB to transmit the small cell eNB configuration information including the indicator indicating the selected specific cell to the macro eNB.

The controller 1810 also may control the overall eNB operations described with reference to FIGS. 1 to 16.

Although the present disclosure has been described with embodiments, various changes and modifications may be suggested to one skilled in the art. It is intended that the present disclosure encompass such changes and modifications as fall within the scope of the appended claims.

What is claimed is:

1. A method by a master base station in a wireless communication system, the method comprising:
   transmitting, to a secondary base station, a first message requesting establishment of a secondary cell group (SCG) of the secondary base station;
   receiving, in response to the transmission of the first message, a second message including information on a SCG configuration from the secondary base station, the information on the SCG configuration including information on a primary secondary cell (PSCell) of the SCG; and
   transmitting a radio resource control (RRC) reconfiguration message including the information on the PSCell to a terminal.

2. The method of claim 1, wherein the PSCell is used for transmitting a physical uplink control channel (PUCCH) of the terminal through the secondary base station.

3. The method of claim 1,
   wherein the information on the PSCell includes at least one of a cell identification information and a SCell index.

4. The method of claim 1, further comprising:
   receiving measurement report from the terminal, wherein the first message is transmitted based on the measurement report.

5. The method of claim 1,
   wherein the PSCell is selected by the secondary base station based on the first message.

6. A master base station in a wireless communication system, the master base station comprising:
   a transceiver configured to transmit and receive a signal; and
   a controller configured to:
      transmit, to a secondary base station, a first message requesting establishment of a secondary cell group (SCG) of the secondary base station;
      receive, in response to the transmission of the first message, a second message including information on a SCG configuration from the secondary base station, the information on the SCG configuration including information on a primary secondary cell (PSCell) of the SCG; and
      transmit a radio resource control (RRC) reconfiguration message including the information on the PSCell to a terminal.

7. The master base station of claim 6, wherein the PSCell is used for transmitting a physical uplink control channel (PUCCH) of the terminal through the secondary base station.

8. The master base station of claim 6,
   wherein the information on the PSCell includes at least one of a cell identification information and a SCell index.

9. The master base station of claim 6, wherein the controller is further configured to receive measurement report from the terminal, and
   wherein the first message is transmitted based on the measurement report.

10. The master base station of claim 9,
    wherein the PSCell is selected by the secondary base station based on the first message.

11. A secondary base station in a wireless communication system, the secondary base station comprising:
    a transceiver configured to transmit and receive a signal; and
    a controller configured to:
       receive a first message requesting establishment of a secondary cell group (SCG) of the secondary base station from a master base station serving a terminal, and
       determine a primary secondary cell (PSCell) within the SCG, and
       transmit a second message including information on a SCG configuration to the master base station, the information on the SCG configuration including information on the PSCell.

12. The secondary base station of claim 11, wherein the PSCell is used for transmitting a physical uplink control channel (PUCCH) of the terminal through the secondary base station.

13. The secondary base station of claim 11, wherein a radio resource control (RRC) reconfiguration message including the information on the PSCell is transmitted to a terminal by a master base station.

14. The secondary base station of claim 11,
    wherein the information on the PSCell includes at least one of a cell identification and a SCell index.

15. A method by a secondary base station in a wireless communication system, the method comprising:
    receiving a first message requesting establishment of a secondary cell group (SCG) of the secondary base station from a master base station serving a terminal, and
    determining a primary secondary cell (PSCell) within the SCG; and
    transmitting a second message including information on a SCG configuration to the master base station, the information on the SCG configuration including information on the PSCell.

16. A terminal in a wireless communication system, the terminal comprising:
    a transceiver configured to transmit and receive a signal; and
    a controller configured to:
       transmit measurement report to a master base station,
       receive a radio resource control (RRC) reconfiguration message including information on a primary secondary cell (PSCell) of a secondary base station from the master base station, and
       transmit a physical uplink control channel (PUCCH) to the secondary base station through the PScell,
    wherein the PSCell is determined by the secondary base station, and a secondary cell group (SCG) configuration including the information on the PSCell is transmitted from the secondary base station to the master base station.

17. The terminal of claim 16, wherein the information indicating the PSCell includes at least one of a cell identification and a SCell index.

18. A method by a terminal in a wireless communication system, the method comprising:
- transmitting measurement report to a master base station;
- receiving a radio resource control (RRC) reconfiguration message including information on a primary secondary cell (PSCell) of a secondary base station from the master base station; and
- transmitting a physical uplink control channel (PUCCH) to the secondary base station through the PScell,
- wherein the PSCell is determined by the secondary base station, and a secondary cell group (SCG) configuration including the information on the PSCell is transmitted from the secondary base station to the master base station.

\* \* \* \* \*